United States Patent [19]

Stanssens

[11] Patent Number: 5,830,943
[45] Date of Patent: Nov. 3, 1998

[54] PROCESS FOR THE PREPARATION OF A MODIFIED POLYMER FOR POWDER PAINTS

[75] Inventor: Dirk A. W. Stanssens, Houthalen, Belgium

[73] Assignee: DSM N.V., Heerlen, Netherlands

[21] Appl. No.: 681,413

[22] Filed: Jul. 23, 1996

[30] Foreign Application Priority Data

Jan. 24, 1994 [NL] Netherlands ............... 9400107

[51] Int. Cl.$^6$ .............. C08J 3/00; C08K 3/20; C08L 75/00; C08F 8/30
[52] U.S. Cl. .......... 524/590; 523/318; 524/589; 525/28; 525/107; 525/440; 525/123; 525/455; 528/44
[58] Field of Search .............. 525/123, 455, 525/28, 107, 440; 528/44; 523/318; 524/589, 590

[56] References Cited

U.S. PATENT DOCUMENTS

| | | | |
|---|---|---|---|
| 3,286,992 | 11/1966 | Armeniades et al. | 259/4 |
| 3,404,869 | 10/1968 | Harder | 259/4 |
| 3,664,638 | 5/1972 | Grout et al. | 259/4 |
| 3,704,006 | 11/1972 | Grout et al. | 259/4 |
| 3,940,453 | 2/1976 | Labana et al. | 260/836 |
| 4,535,132 | 8/1985 | Ambrose et al. | 525/443 |
| 4,818,791 | 4/1989 | Murakami et al. | 525/124 |
| 4,900,800 | 2/1990 | Halpaap et al. | 528/66 |
| 5,097,006 | 3/1992 | Kapilow et al. | 528/272 |

FOREIGN PATENT DOCUMENTS

| | | |
|---|---|---|
| 0 145 006 A2 | 6/1985 | European Pat. Off. . |
| 145 006 | 6/1985 | European Pat. Off. . |
| 0 242 714 A2 | 10/1987 | European Pat. Off. . |
| 242 714 | 10/1987 | European Pat. Off. . |
| 0 551734 A1 | 7/1993 | European Pat. Off. . |
| 551 734 | 7/1993 | European Pat. Off. . |
| 600 546 | 6/1994 | European Pat. Off. . |

*Primary Examiner*—Patrick D. Niland
*Attorney, Agent, or Firm*—Pillsbury Madison & Sutro LLP

[57] ABSTRACT

The invention relates to a process for the preparation of a modified polymer by reaction between a reactive polymer and at least a compound containing two or more functional groups. The polymer, which is solid at room temperature, is mixed, at a temperature at which the viscosity of the polymer is lower than 10000 dPas (measured according to Emila), with a compound containing two or more functional groups in a mixing means for achieving a homogeneous product and the mean residence time and the residence time distribution being chosen so that more than 50% of the reactive groups of the polymer has reacted.

As means to make the composition homogeneous use is made of a static mixer.

The functional groups of the compound containing two or more functional groups have different reactivities.

The invention also relates to a binder composition, which comprises the modified polymer thus obtained and a crosslinker.

12 Claims, No Drawings

PROCESS FOR THE PREPARATION OF A MODIFIED POLYMER FOR POWDER PAINTS

This is a continuation of International Appln No. PCT/NL95/00025 filed Jan. 18, 1995 which designated the U.S.

The present invention relates to a process for the preparation of a modified polymer which can be used in the preparation of powder paints.

In the preparation of powder coatings various types of curing reactions are employed. Regarding, for example, Misev "Powder Coatings, Chemistry and Technology" (John Wiley, 1991, pages 44–57) the curing reactions are mainly limited to reactions between a polymer having acid-, hydroxyl- or epoxy groups and a crosslinker.

Other polymers for use in the preparation of powder paints are not commercially available.

It is the object of the present invention to provide polymers with any desired functional group. The binder composition based on this polymer has to be non-toxic and non-mutagenic. Furthermore, a binder composition based on these polymers should, for instance, have a good reactivity in combination with other desired properties and result in powder coatings having properties such as, for example, a good flow, good chemical resistance, high scratch resistance, good mechanical properties, good outdoor durability or a good colour stability.

The present invention provides a process for preparing a modified polymer by reaction between a reactive polymer and at least a compound containing two or more functional groups, which comprises mixing of the polymer, which is solid at room temperature, with a compound containing two or more functional groups, at a temperature at which the viscosity of the polymer is lower than 10000 dPas (measured according to Emila) in a mixing means for achieving a homogeneous product and the mean residence time and the residence time distribution being chosen so that more than 50% of the reactive groups of the polymer has reacted.

Preferably the mean residence time, the residence time distribution and the temperature are chosen so that more than 80% of the reactive groups has reacted. More preferably, said times and temperature are chosen so that almost all reactive groups of the polymer have reacted.

The mean residence time and the residence time distribution can, for example, be measured by means of tracers. See for this for instance: Perry, Chem. Eng. Handbook, 5th ed., McGraw-Hill, pp. 4–27.

The mean residence time is the time after which—after the injection of a tracer—50% of the tracer has left the mixing equipment.

The residence time distribution (as defined here) is the time from the moment the first quantity of tracer pulse is injected till the moment at which 99% of the tracer has left the device.

The mean residence time can also be calculated by dividing the volume of the equipment ($m^3$) by the sum of the flow rates of all components which are dosed ($m^3$/sec).

Another method to define the residence time distribution is the time elapsed between the mean residence time and the moment at which 99% of the tracer has left the device. In order to differentiate between the two definitions, the latter will be called the residence time variance.

The process is carried out at a temperature above the melting points of the two components. The reaction time needed can be shortened by using a catalyst, which gives more freedom in the choice of the residence time.

The compound having a functionality of two or higher is a modifier for the polymer.

The process according to the present invention makes it possible to obtain a polymer having specific desired functional groups. This process enables to provide polymers having carboxyl-, hydroxyl- and epoxy-functional groups but also polymers having for example acrylate-, cycloaliphatic epoxides, glycidyl-, vinylether- or isocyanate functional groups.

The process according to the invention also allows several compounds containing two or more functional groups to react.

The process according to the present invention has advantages compared with, for instance, a process using a batch reaction or a process using an extruder.

A special advantage of the process according to the invention (compared with the batch reaction) is the relatively short time of the functional groups at a relatively high temperature. This limits the side reactions such as polymerization and degradation.

The mean residence time in the process according to the invention is generally less than 20 minutes, preferably less than 10 minutes, and more preferably less than 5 minutes, whereas the mean residence time in a batch process often exceeds 6 hours due to the reaction time, mixing time and processing time before the endproduct is transported to a cooling section. The residence time partly depends on the reactivity of the chosen components and on the temperature.

Generally, the residence time variance is less than about 20 min.

When a batch process is used, isocyanate-functional polymers, for instance, may at high temperatures, for example above 160° C., be dimerized or trimerized into compounds having a relatively high molecular weight, which has a negative effect on the flow of the powder paint. In addition, the reproducibility of the modified polymers thus obtained is low.

A further advantage of the process according to the present invention is the short mixing time needed for homogenization of the polymer and the modifier. This leads to a more selective reaction, which means that the degree of chain extension will be lower and as a consequence the flow of the resulting powder paint will be better.

An advantage of the process according to the present invention compared with a process in which the modification is carried out in an extruder is the better homogenization as a function of time.

The homogeneity of the product can be measured on the basis of the variation in the quantity of functional groups in the product. With the process according to the invention, the variation of this quantity is, in general, less than 20% relative to the measured type of the functional group.

Another advantage of the process according to the present invention (in comparison with the process in an extruder) is the possibility of using modifiers that are liquid at room temperature.

The viscosity of the polymer is preferably less than 10000 dlpas, more preferably less than 5000 dPas, at the mixing temperature. A lower viscosity is advantageous because in general the mixing will be accomplished faster and also the selectivity of the reaction will be enhanced. The viscosity will in general be higher than 10 dpas.

The viscosity is measured according to Emila by using an Emila rotary viscometer as described in, for instance, 'Powder Coatings, Chemistry and Technology', by T. Misev, 1991, John Wiley & Sons, pp. 287–288.

The mixing temperature generally lies between 120° C. and 250° C. The mixing time generally exceeds five seconds, while it is preferably shorter than two minutes, in particular shorter than one minute. After mixing the mixture is kept at the reaction temperature for some time, if desired. The mixture is subsequently cooled.

The process according to the present invention can very suitably be used immediately after the synthesis of the polymer, for generally this synthesis is already carried out at a high temperature (the polyester preparation, for instance, is carried out at a temperature between 220° C. and 250° C.). The polymer is usually cooled or heated to give it the desired temperature. In general, it is advantageous to preheat the modifier, for instance to 60°–120° C., in order to prevent a strong cooling down—and viscosity increase—of the polymer during mixing. However, cooling down can also be prevented by heating the mixing equipment.

In general, a mixer, that is suitable for the process according to the invention, is of such a design that the components substantially pass through the mixer in plug flow.

By preference, the mixer is of such a design that—with application of the process according to the present invention—the residence time distribution is short.

Exemplary means for achieving a homogeneous product in the process of the present invention include continuous static and dynamic mixers.

Preferably a static mixer or a combination of static mixers is used. A static mixer requires little maintenance and is hardly subject to wear. A static mixer can also handle much material in a short time. Very suitable static mixers include, for example, a Kenics type mixer, a Sulzer mixer (SMX, SMXL or SMR) and static mixers of Toray, Erestat, Wymbs Eng. Ltd., Premixer Quarto, Premixer, Ross ISG, Komax, Lightnin, Prematechnik and Bran und Lübbe. A Sulzer SMR-type mixer can be heated or cooled easily if needed.

Kenics type static mixers are described in U.S. Pat. No. 3,286,992, U.S. Pat. No. 3,664,638 and U.S. Pat. No. 3,704,006, the disclosures of which are incorporated herein by reference. Other mixers are described in U.S. Pat. No. 3,404,869, the disclosure of which is incorporated herein by reference.

It is possible to have, for instance, two or more modifications take place successively by arranging two or more static mixers in series. This method can, for instance, be used to prepare an acrylate-terminated polyester by mixing a diisocyanate compound with a hydroxyl-functional polyester in a first mixer and subsequently mixing in a second mixer an acrylate, for instance hydroxyethyl (meth)acrylate, with the product obtained in the first mixer.

In general, the modified polymer, suitable for use in the preparation of a powder paint, has a Tg that is higher than 30° C. After reaction the modified polymer is cooled to a temperature below the Tg, after which the glass-like polymer can be broken and/or ground.

Preferably, the compound containing two or more functional groups contains functional groups having different reactivities.

The compound containing two or more functional groups (which acts as the modifier) preferably has one group having a high reactivity and one or more groups having a low reactivity. This gives a selective reaction. The reactivity of the more reactive group in the modifier is preferably such that more than 80% of the groups has reacted within 10 minutes at less than 250° C.

The difference in reactivity can be obtained, in that the compound on the one hand contains a primary and on the other hand a secondary and/or tertiary functional group. Said difference in reactivity can also be obtained in that a modifier is chosen with, for example, on the one hand an anhydride group and on the other a carboxylic acid group.

In general, at the mixing temperature the reactivity of the first functional group: the reactivity of the second functional group is higher than 2:1. The difference in reactivity may be very large, as it is also possible for the second group to show no or hardly any reactivity compared with the reactive group of the polymer.

The reactivity at the mixing temperature can be defined as the rate at which the concentration of reactive groups decreases as a function of time.

A large difference in reactivity results in less chain extension and in a better flow of the powder paint.

Suitable polymers include all polymers that can be used in the preparation of thermosetting powder paints.

Suitable polymers include, for example, polyacrylates, crystalline polyesters, polyurethanes, saturated and unsaturated polyesters, polyethers, polycarbonates, polybutadienes, styrene-maleic anhydride copolymers and fluorine-containing polymers.

Preferably, the polymer is an amorphous polyester or a polyacrylate. Generally, the polyesters have an acid number between 15 and 200 mg KOH/g resin or a hydroxyl number between 15 and 100 mg KOH/g resin.

Suitable reactive groups of the polymer include for example carboxyl, hydroxyl, phosphoric acid, amine, isocyanate, carboxyl anhydride and/or epoxy groups. Preferably, the polymer contains hydroxyl, carboxyl or epoxy groups.

The most reactive group of the compound containing two or more functional groups may, for instance, be an isocyanate, epoxy, thiol, cyclic carbonate, amine, hydroxy, β-hydroxyalkyl amide, acid or anhydride group.

Examples of suitable compounds containing two or more functional groups include isophorone diisocyanate (IPDI), toluene diisocyanate (TDI) and 3,4-isocyanate methyl-1-methyl cyclohexyl isocyanate (IMCI), vinyl cyclohexene diepoxide, glycerol carbonate, allyl glycidyl ether, diethanol amine, hydroxy ethyl acrylate and glycidyl acrylate.

Generally, these compounds are liquid at mixing temperature,

The reactive groups of the polymer must react rapidly with the functional groups of the modifier. Preferred combinations of the reactive polymer and the compound containing functional groups are obtained by combining the complementary reactive groups hydroxyl and isocyanate, such as for example a hydroxyl-functional polyester with IMCI; carboxyl and epoxy, such as for example a carboxyl-functional polyester with allyl glycidyl ether; or hydroxyl and anhydride, such as for example a hydroxyl-functional polyester with trimellitic anhydride.

The modification reaction of the polymer can be applied in the presence of a catalyst, such as, for example, dibutyltin dilaurate in the hydroxy-isocyanate reaction.

The polymer:modifier weight ratio will generally be between 70:30 and 97:3 and depends partly on the functionality of the modifier. It is possible to choose other ratios. In general, one modifier molecule will be used per reactive group of the polymer.

If, for instance, a hydroxyl-functional polymer is used as the polymer and a compound containing diisocyanate groups as the functional compound, then the molar ratio OH:NCO will usually be chosen between 1:1.8 and 1:2.2.

The preparation of thermosetting powder paints and chemical curing reactions of these powder paints yielding powder coatings are generally described in, for instance, Misev, Powder Coatings, Chemistry and Technology (1991, John Wiley), pp. 44–54, p. 148 and pp. 225–226 (the disclosures of which are incorporated herein by reference).

The curing reaction between the modified polymer according to the invention and the crosslinker which yields the final cured coating will in general take place in the presence of an effective amount of catalyst. The importance of the ratio between the polymer and the crosslinker and of the amount of catalyst is explained in Misev, Powder Coatings, Chemistry and Technology, pp. 174–223 (the disclosure of which are incorporated herein by reference).

The choice of the crosslinker depends partly on the nature of the functional groups on the modified polymer.

If the modified polymer contains, for instance, isocyanate-functional groups, the crosslinker may contain hydroxyl, amine, thiol, enamine or acetoacetate functional groups.

Application of the modified polymers according to the invention makes it possible for the crosslinker to be a low-molecular compound (such as for example trimethylol propane) as well as a polymer (such as for example a hydroxyl-functional polyester).

If IMCI is used as modifier, tertiary isocyanate functionalized polymers are obtained. Such functional groups do not need a blocking agent, for they have a relatively low reactivity compared with a customary reactive component with hydroxyl groups. This also makes it possible to mix such polymers with a hydroxy functional crosslinker in an extruder without any significant preliminary reaction taking place.

The crosslinker and the modified polymer can be mixed using, for instance, an extruder, but also using a static mixer. In the latter method two static mixer can be arranged in series, with the polymer modification being carried out in the first mixer, while mixing with the crosslinker can take place in the second mixer. The two static mixers may differ in shape and/or be operated at different temperatures to enable control of the specific processes in the in-line mixers.

Examples of other suitable crosslinkers include trisglycidyl isocyanurate (TCIC), poly-bisphenol-A epoxides, compounds containing β-hydroxylalkylamide groups and crosslinkers containing epoxy groups, with the crosslinker comprising at least one linear or branched aliphatic chain with 5–26 carbon atoms, such as for example epoxidized soybean oil or epoxidized linseed oil (which are disclosed in EP-A-600546, the disclosure of which is incorporated herein by reference).

Of course all customary additives can, if desired, be used in the powder coating systems according to the invention, such as, for example, pigments, fillers, deaerating agents, flow-promoting agents and stabilizers. Pigments include inorganic pigments, such as titanium dioxide, zinc sulphide, iron oxide and chromium oxide, as well as organic pigments such as azo compounds. Fillers comprise metal oxides, silicates, carbonates and sulphates.

As additives, stabilisers such as primary and/or secondary antioxidants and UV stabilizers such as, for example, quinones, (sterically hindered) phenolic compounds, phosphonites, phosphites, thioethers and HALS compounds (Hindered Amine Light Stabilizers) can be used. In order to obtain powder coatings that have good stability during cure, the primary antioxidants appear important. Therefore, the powder paint preferably includes an effective amount of stabilizer, which in general is an amount of 0.1–2 wt. % with respect to the binder composition.

Deaerating agents are exemplified by benzoin and cyclohexane dimethanol bisbenzoate. Flow-promoting agents include, among others, polyalkyl acrylates, fluorohydrocarbons and silicon oils. Other additives include those which are used to improve tribo charging, such as, for example, sterically hindered tertiary amines.

Powder paints according to the invention can be applied in the customary manner, for example by electrostatic spraying of the powder onto an earthed substrate, and curing the coating by subjecting it to heat for a sufficient time at a suitable temperature or by irradiation with UV-light or electron-beam. The applied powder can be heated in, for example, a gas furnace, an electric furnace or by means of infrared radiation.

Industrial thermosetting coatings from powder paint (coating) compositions are further generally described in Misev, Powder Coatings, Chemistry and Technology, pp. 141–173 (1991).

Compositions according to the present invention can be used in powder coatings for use on metal, wood and plastic substrates. Examples are general-purpose industrial coatings, coatings for machinery and for example for cans, domestic and other small equipment. Furthermore, the coatings are quite suitable in the automotive industry, to coat exterior and/or interior parts of vehicles such as cars.

The invention will be further described based on the following non-limiting examples.

Example I 1000 grams of a carboxylic acid functional polyester, having an acid value of 26 mg KOH/g, a Tg of 68° C., a viscosity of 910 dpas (Emila, 165° C.) and a functionality of 2 was mixed at 180° C. with a mixture of allylglycidylether and dimethyl benzylamine using a slight molar excess of allylglycidyl ether (1.1 equivalents epoxy groups compared to the carboxylic acid groups).

The amount of dimethyl benzylamine, which acts as a catalyst for the epoxy-carboxylic acid reaction, is 0.1% by weight relative to the polyester resin. After a mixing in a Sulzer-SMX static mixer during 30 sec., the mixture was led to a Sulzer SMXL static mixer with a mean residence time of 3 minutes. In this SMXL-static mixer the mixture was kept at 180° C. The modified polymer was subsequently led to the cooling conveyor. The resulting modified polymer had an acid value of 0.5 mg KOH/g, a Tg of 43° C. and a viscosity of 260 dPas (Emila, 165° C.).

EXAMPLE II

A hydroxy terminated compound was made from propoxylated bisphenol-A (BPA-2PO) (6880 g, 20 moles) and maleic anhydride (980 g, 10 moles) at a temperature of 210° C. The formed water was removed via a distillation column. The reaction was continued until the acid number was 5 and the hydroxyl number 150 mg KOH/g resin. To this product (690 g, 0.95 moles) was added hydroquinone (1.38 g), di-tert butyl-p-cresol (0.83 g) and tin octoate (0.76 g). The reaction mixture was heated to 130° C. and was mixed in a Sulzer SMX static mixture with 2-hydroxypropylmethacrylate (262 g, 1.82 moles) at 130° C. during 30 sec. Subsequently the reaction mixture was led to a combination of a Sulzer SMX static mixer and a Sulzer SMXL static mixer where toluene diisocyanate (consisting of 80% of the 2,4 isomer and 20% of the 2,6 isomer) (310 g, 1.78 moles) was added. The mixing time in the SMX static mixer was 30 sec and the mean residence time in the SMXL static mixer 10 min. The mixture was held at 130° C. After this the mixture was cooled.

The resulting modified polymer had a melting range of 72°–82° C., a glass transition temperature of 53° C., an acid number of 4 mg KOH/g resin, an isocyanate content below 0.5 wt. % and a viscosity of 33 dpa.s (Emila, 150° C.).

I claim:

1. A process for preparing a modified polymer comprises the step(s) of:

mixing a polymer having reactive groups which is solid at room temperature and which is selected from the group consisting of polyacrylates, polyesters, polyethers, polycarbonates, polybutadienes, styrene-maleic anhydride copolymers and fluorine-containing polymers with at least one compound containing two or more functional groups which are capable of reacting with the reactive groups of said polymer, wherein the at least one compound has at least one most reactive group which is selected from the group consisting of isocyanate, epoxy, thiol, cyclic carbonate, amine, hydroxy, β-hydroxyalkylamide, acid or anhydride, wherein the mixing with said compound containing two or more functional groups is at a temperature at which the viscosity of said polymer is less than 10000 dPas (measured according to Emila), wherein a mixing device for achieving a homogeneous product which comprises a static or dynamic mixer is used in said mixing, provided that the mean residence time and the residence time distribution in said mixing device are selected so that more than 50% of the reactive groups of the polymer have reacted with said compound.

2. A process for preparing a modified polymer comprises the steps of:

1) mixing a polymer having reactive groups which is solid at room temperature and which is selected from the group consisting of polyacrylates, polyesters, polyethers, polycarbonates, polybutadienes, styrene-maleic anhydride copolymers and fluorine-containing polymers, with at least one compound containing two or more functional groups which are capable of reacting with the reactive groups of said polymer, wherein said at least one compound has at least one most reactive group which is selected from the group consisting of isocyanate, epoxy, thiol, cyclic carbonate, amine, hydroxy, β-hydroxyalkylamide, acid or anhydride, wherein said mixing is conducted at a temperature at which the viscosity of said polymer is less than 10,000 dPas (measured according to Emila), and using a mixing device for achieving a homogeneous product which comprises a static or dynamic mixer, provided that the mean residence time and the residence time distribution in said mixing device are selected so that more than 50% of the reactive groups of the polymer have reacted with said compound; and 2) further mixing the product, from said first mixing step, with at least one additional compound containing two or more functional groups which are capable of reacting with the reactive groups of said product, wherein said at least one additional compound has at least one most reactive group which may be the same or different from the most reactive group on said at least one compound in said first step, wherein said further mixing is conducted at a temperature at which the viscosity of said product is less than 10,000 dPas (measured according to Emila), and using the same mixing device as in said first mixing step or a further mixing device which comprises a static or dynamic mixer, provided the mean residence time and the residence time distribution in said mixing device are selected so that more than 50% of the reactive groups of said product have reacted with said at least one additional compound; and wherein said product, from said first mixing step, comprises an acrylate-terminated polyester, and said additional compound comprises an acrylate.

3. The process according to claim 2, wherein said mixing device is a static mixer.

4. A binder composition adapted for use in the preparation of thermosetting powder paints, which binder composition comprises a modified polymer obtained according to claim 2.

5. The process according to claim 1, wherein the mixing device is a static mixer.

6. The process according to claim 1 or 5, wherein the polymer contains hydroxyl, carboxyl or epoxy groups and the compound containing two or more functional groups is isophorone diisocyanate, toluene diisocyanate, 3,4-isocyanate methyl-1-methyl cyclohexyl isocyanate, vinyl cyclohexene diepoxide, glyceron carbonate, allyl glycidyl ether, diethanol amine, hydroxy ethyl acrylate or glycidyl acrylate.

7. The process according to claim 1 or 5, wherein the polymer is a hydroxyl functional polyester and the compound containing two or more functional groups is 3,4-isocyanate methyl-1-methyl-1-cyclohexyl isocyanate.

8. The process according to claim 1 or 5, wherein said process comprises a further mixing step wherein the homogeneous product obtained from the first mixing step is mixed with at least one additional compound containing two or more functional groups which are capable of reacting with the reactive groups of said homogeneous product, wherein the at least one additional compound has at least one most reactive group which may be the same or different from the most reactive group on said at least one compound in said first step, wherein the further mixing with said at least one compound containing two or more functional groups is at a temperature at which the viscosity of said homogeneous product is less than 10000 dPas (measured according to Emila), wherein a mixing device which comprises a static or dynamic mixer is used in said further mixing step, provided that the mean residence time and the residence time distribution in said mixing device are selected so that more than 50% of the reactive groups of the homogeneous product have reacted with said at least one additional compound.

9. A process according to claim 2, wherein said at least one additional compound is hydroxyethyl (meth) acrylate.

10. A modified polymer obtained according to claim 1.

11. A binder composition adapted for use in the preparation of thermosetting powder paints, which binder composition comprises a modified polymer obtained according to claim 9 and a crosslinker therefor.

12. A powder paint comprising a binder composition according to claim 11 and, optionally at least one member from the group consisting of pigment, catalyst, curing agent, filler and additives.

* * * * *